US011386604B2

(12) United States Patent
Richter et al.

(10) Patent No.: US 11,386,604 B2
(45) Date of Patent: Jul. 12, 2022

(54) MOVING AN AVATAR BASED ON REAL-WORLD DATA

(71) Applicant: Apple Inc., Cupertino, CA (US)

(72) Inventors: Ian M. Richter, Los Angeles, CA (US); Cameron J. Dunn, Los Angeles, CA (US); John C. Russell, Playa del Rey, CA (US)

(*) Notice: Subject to any disclaimer, the term of this patent is extended or adjusted under 35 U.S.C. 154(b) by 0 days.

(21) Appl. No.: 17/275,046

(22) PCT Filed: Sep. 24, 2019

(86) PCT No.: PCT/US2019/052585
§ 371 (c)(1),
(2) Date: Mar. 10, 2021

(87) PCT Pub. No.: WO2020/068739
PCT Pub. Date: Apr. 2, 2020

(65) Prior Publication Data
US 2022/0058847 A1   Feb. 24, 2022

Related U.S. Application Data

(60) Provisional application No. 62/737,771, filed on Sep. 27, 2018.

(51) Int. Cl.
*G06T 13/40* (2011.01)
*G06T 7/10* (2017.01)
(Continued)

(52) U.S. Cl.
CPC .............. *G06T 13/40* (2013.01); *G06F 3/011* (2013.01); *G06T 7/10* (2017.01); *G06T 7/73* (2017.01)

(58) Field of Classification Search
None
See application file for complete search history.

(56) References Cited

U.S. PATENT DOCUMENTS 6,244,987 B1 * 6/2001 Ohsuga ................. A63B 24/00
482/4
2011/0199291 A1   8/2011 Tossell et al.
(Continued)

OTHER PUBLICATIONS

Boulbaba Ben Amor et al.; "Action Recognition Using Rate-Invariant Analysis of Skeletal Shape Trajectories;" IEEE Transactions on Pattern Analysis and Machine Intelligence, vol. 38, No. 1, Jan. 2016; 13 pages (Year: 2016).*
(Continued)

*Primary Examiner* — Edward Martello
(74) *Attorney, Agent, or Firm* — Fernando & Partners, LLP

(57) ABSTRACT

In some implementations, a method is performed by a device including a non-transitory memory and one or more processors coupled with the non-transitory memory. In some implementations, the method includes obtaining user movement information. In some implementations, the user movement information characterizes a first body pose of the user at a first time and a second body pose of the user at a second time. In some implementations, the method includes determining whether a transition from the first body pose to the second body pose satisfies an acceptability threshold. In some implementations, the method includes in response to determining that the transition from the first body pose to the second body pose satisfies the acceptability threshold, generating a sequence of movements for a synthesized reality (SR) representation of the user.

18 Claims, 6 Drawing Sheets

(51) Int. Cl.
*G06T 7/73* (2017.01)
*G06F 3/01* (2006.01)

(56) References Cited

U.S. PATENT DOCUMENTS

| | | | | |
|---|---|---|---|---|
| 2013/0083009 | A1* | 4/2013 | Geisner | A63B 71/00 345/419 |
| 2013/0243255 | A1* | 9/2013 | Williams | G06F 3/011 382/103 |
| 2014/0287389 | A1* | 9/2014 | Kallmann | G16H 20/30 434/247 |
| 2014/0347392 | A1* | 11/2014 | Odessky | G06T 13/40 345/633 |
| 2015/0133820 | A1* | 5/2015 | Zohar | A61B 5/1121 600/595 |
| 2015/0199824 | A1* | 7/2015 | Kim | G06K 9/00355 382/103 |
| 2015/0325004 | A1* | 11/2015 | Utsunomiya | G06K 9/00348 382/103 |
| 2016/0070958 | A1* | 3/2016 | Whelan | A61B 5/1123 382/107 |
| 2018/0165864 | A1 | 6/2018 | Jin et al. | |
| 2018/0204368 | A1 | 7/2018 | Tong et al. | |
| 2018/0357472 | A1* | 12/2018 | Dreessen | G06T 3/60 |
| 2020/0051446 | A1* | 2/2020 | Rubinstein | G09B 5/02 |

OTHER PUBLICATIONS

Y. Chen, C. Shen, X.-S. Wei, L. Liu and J. Yang, "Adversarial PoseNet: A Structure-Aware Convolutional Network for Human Pose Estimation," 2017 IEEE International Conference on Computer Vision (ICCV), 2017, pp. 1221-1230, doi: 10.1109/ICCV. 2017.137. (Year: 2017).*

Slama, et al.;"Accurate 3D action recognition using learning on the Grassmann manifold;" Pattern Recognition, vol. 28 (2015), pp. 556-567; Elsevier Ltd—(Year: 2015).*

PCT International Search Report and Written Opinion dated Feb. 4, 2020, International Application No. PCT/US2019/052585, pp. 1-16.

* cited by examiner

MOVING AN AVATAR BASED ON REAL-WORLD DATA

CROSS-REFERENCES TO RELATED APPLICATIONS

This application is the national phase entry of Intl. Patent App. No. PCT/US2019/052585, filed on Sep. 24, 2019, which claims priority to U.S. Provisional Patent App. No. 62/737,771, filed on Sep. 27, 2018, which are both hereby incorporated by reference in their entireties.

TECHNICAL FIELD

The present disclosure generally relates to synthesized reality (SR) environments, and in particular to moving an SR representation of a person (e.g., an avatar) based on real-world data.

BACKGROUND

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a synthesized reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a hologram). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
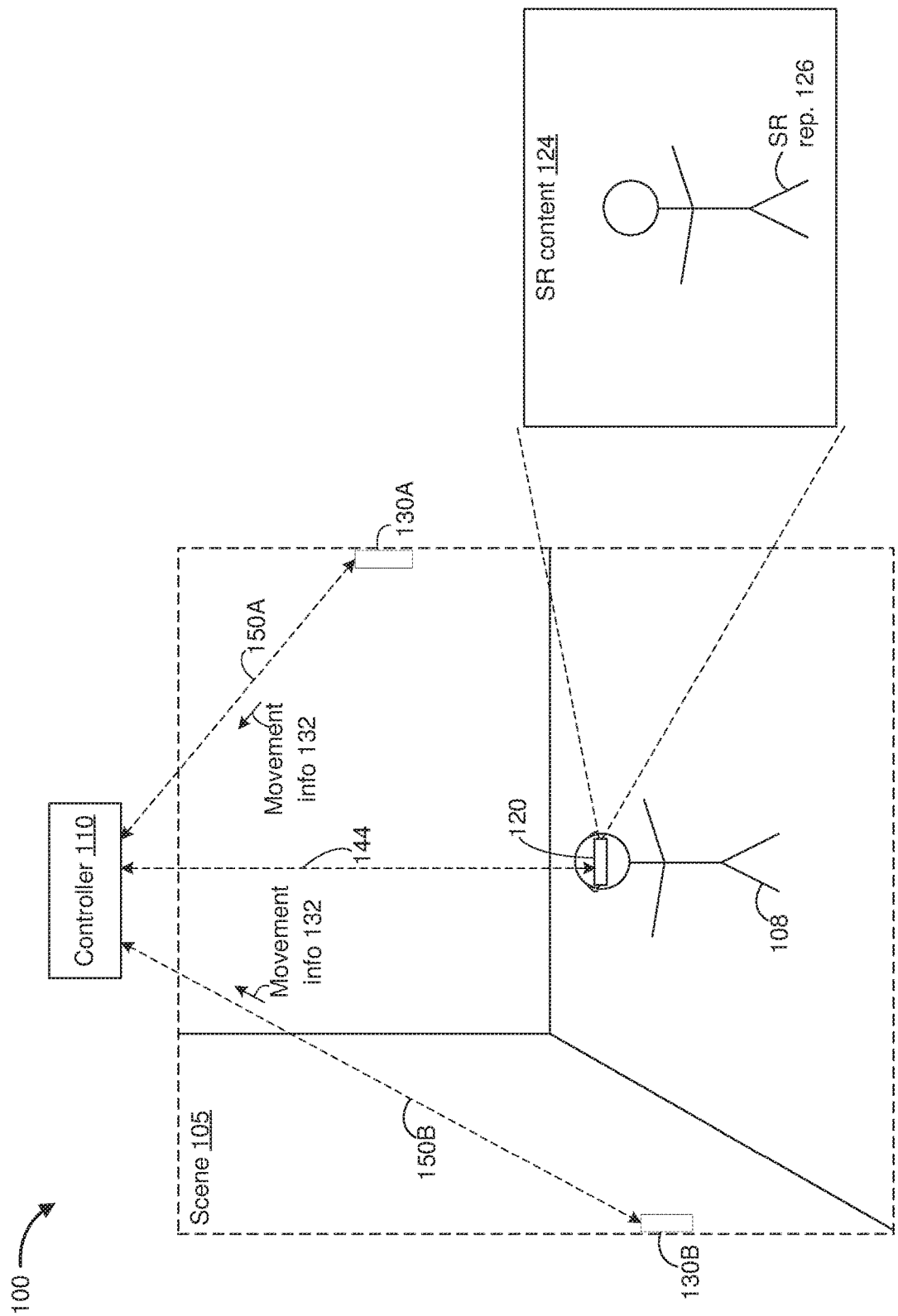
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for moving a synthesized reality (SR) representation of a user based on real-world data. In some implementations, a method is performed by a device including a non-transitory memory and one or more processors coupled with the non-transitory memory. In some implementations, the method includes obtaining user movement information. In some implementations, the user movement information characterizes a first body pose of the user at a first time and a second body pose of the user at a second time. In some implementations, the method includes determining whether a transition from the first body pose to the second body pose satisfies an acceptability threshold. In some implementations, the method includes in response to determining that the transition from the first body pose to the second body pose satisfies the acceptability threshold, generating a sequence of movements for a synthesized reality (SR) representation of the user.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Various implementations of the present disclosure enable SR systems to generate a sequence of movements for an SR representation of a user based on movement information for the user. The movement information for the user characterizes body poses of the user at different times. For example, the movement information characterizes a first body pose of the user at a first time and a second body pose of the user at a second time. If a transition between different body poses satisfies an acceptability threshold, the SR representation is moved according to the sequence of movements generated for the SR representation. For example, if the transition between the first body pose and the second body pose satisfies the acceptability threshold, then the SR representation is moved according to the sequence of movements generated for the SR representation. In some implementations, the acceptability threshold specifies a time duration and the transition satisfies the acceptability threshold if the transition is completed within the time duration specified by the acceptability threshold. In some implementations, the transition satisfies the acceptability threshold if the transition includes a movement that matches a template body movement.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110, a head-mounted device (HMD) 120, and two movement sensors 130A-130B. While the exemplary operating environment 100 in FIG. 1 includes two movement sensors 130A-130B, in some implementations, the operating environment 100 includes additional or fewer movement sensors.

In some implementations, the controller 110 is configured to manage and coordinate an SR experience for a user 108. In some implementations, the controller 110 includes a suitable combination of software, firmware, and/or hardware. The controller 110 is described in greater detail below with respect to FIG. 2. In some implementations, the controller 110 is a computing device that is local or remote relative to a scene 105. For example, the controller 110 may be a local server located within the scene 105. In another example, the controller 110 is a remote server located outside of the scene 105 (e.g., a cloud server, central server, etc.).

In some implementations, the controller 110 is communicatively coupled with the HMD 120 via a wired or wireless communication channel 144 (e.g., BLUETOOTH, IEEE 802.11x, IEEE 802.16x, IEEE 802.3x, etc.). In some implementations, the controller 110 is communicatively coupled with the movement sensors 130A-B via wired or wireless communication channels 150A-B (e.g., BLUETOOTH, IEEE 802.11x, IEEE 802.16x, IEEE 802.3x, etc.). In some implementations, the HMD 120 is communicatively coupled with the movement sensors 130A-B via wired or wireless communication channels (not shown).

In some implementations, the HMD 120 is configured to present SR content to the user 108. In some implementations, the HMD 120 includes a suitable combination of software, firmware, and/or hardware. The HMD 120 is described in greater detail below with respect to FIG. 3. In some implementations, the functionalities of the controller 110 are provided by and/or combined with the HMD 120.

According to some implementations, the HMD 120 presents SR content to the user 108 while the user 108 is virtually and/or physically present within the scene 105. In some implementations, while presenting an augmented reality (AR) experience, the HMD 120 is configured to present AR content and to enable optical see-through of the scene 105. In some implementations, while presenting a mixed reality (MR) experience, the HMD 120 is configured to present MR content and to enable video pass-through of the scene 105.

In some implementations, the user 108 wears the HMD 120 on his/her head. As such, the HMD 120 includes one or more SR displays provided to display the SR content. For example, the HMD 120 encloses the field-of-view of the user 108. In some implementations, the HMD 120 is replaced with a handheld device (such as a smartphone or tablet) configured to present SR content, and rather than wearing the HMD 120 the user holds the device with a display directed towards the field-of-view of the user and a camera directed towards the scene 105. In some implementations, the handheld device can be placed within an enclosure that can be worn on the head of the user. In some implementations, the HMD 120 is replaced with an SR chamber, enclosure, or room configured to present SR content in which the user 108 does not wear the HMD 120.

In some implementations, each movement sensor 130A-B is configured to provide movement information 132 to the controller 110 and/or the HMD 120 while the user 108 is physically within the scene 105. In some implementations, the movement sensors 130A-B include image sensors (e.g., cameras), and the movement information 132 includes images of the user 108. In some implementations, the movement information 132 characterizes one or more body poses of the user 108. In some implementations, the movement information 132 characterizes body poses of the user 108 at different times. For example, the movement information 132 characterizes a first body pose at a first time and a second body pose at a second time. In some implementations, the movement information 132 indicates joint positions and/or joint orientations of the user 108. A movement sensor, such as the movement sensors 130A-B, is described in greater detail below with respect to FIG. 4.

In some implementations, the HMD 120 presents SR content 124 to the user 108. In some implementations, the HMD 120 includes one or more SR displays. In such implementations, the HMD 120 presents the SR content 124 by displaying data corresponding to the SR content 124 on the one or more SR displays. In the example of FIG. 1, the SR content 124 includes an SR representation 126 of the user 108. In some implementations, the controller 110 and/or the HMD 120 cause the SR representation 126 to move based on the movement information 132. In some implementations, the SR representation 126 moves if the movement information 132 indicates that a transition between body poses satisfies an acceptability threshold.

Figure 2:
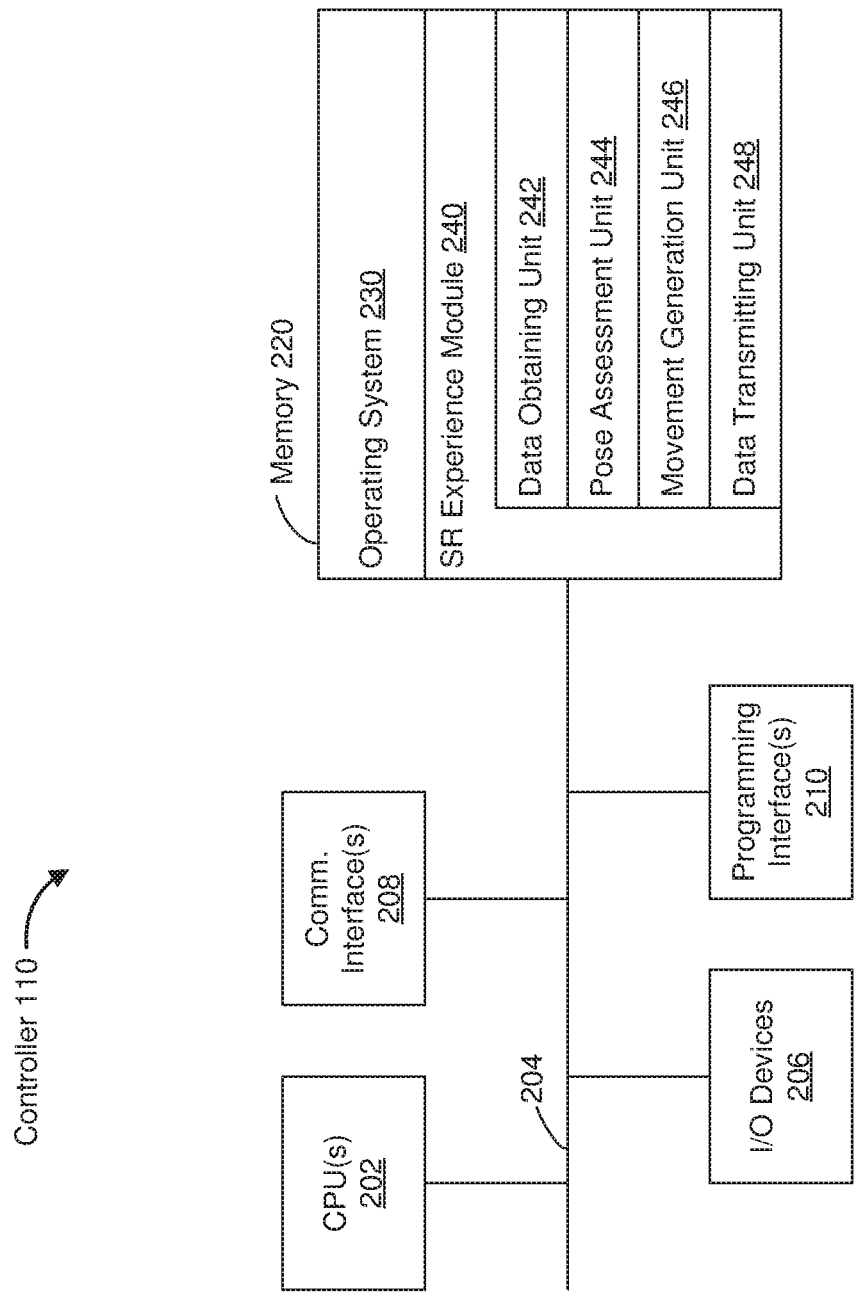
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an SR experience module 240.

The operating system 230 includes procedures for handling various basic system services and for performing hardware dependent tasks. In some implementations, the SR experience module 240 is configured to manage and coordinate one or more SR experiences for one or more users (e.g., a single SR experience for one or more users, or multiple SR experiences for respective groups of one or more users). To that end, in various implementations, the SR experience module 240 includes a data obtaining unit 242, a pose assessment unit 244, a movement generation unit 246, and a data transmitting unit 248.

In some implementations, the data obtaining unit 242 is configured to obtain data (e.g., presentation data, interaction data, sensor data, location data, etc.) from at least one of the HMD 120 and the movement sensors 130A-B. For example, in some implementations, the data obtaining unit 242 obtains the movement information 132 shown in FIG. 1. In some implementations, the data obtaining unit 242 obtains images of the scene 105. In such implementations, the data obtaining unit 242 performs scene understanding to identify the user 108 and body poses of the user 108. For example, in some implementations, the data obtaining unit 242 determines joint positions and/or joint orientations of the user 108 based on the obtained data. To that end, in various implementations, the data obtaining unit 242 includes instructions and/or logic therefor, and heuristics and metadata therefor.

In some implementations, the pose assessment unit 244 determines whether a transition between body poses satisfies an acceptability threshold. For example, in some implementations, the pose assessment unit 244 determines whether a transition from a first body pose of the user 108 at a first time to a second body pose of the user 108 at a second time satisfies the acceptability threshold.

In some implementations, the acceptability threshold is related to spatial acceptability. In some implementations, the pose assessment unit 244 determines whether the transition includes a movement that is within the acceptability threshold of a template body movement. For example, in some implementations, the pose assessment unit 244 determines whether joint positions and/or joint orientations of the user 108 match template joint positions and/or template joint orientations.

In some implementations, the acceptability threshold is related to temporal acceptability. In some implementations, the pose assessment unit 244 determines whether the transition is completed within an amount of time indicated by the acceptability threshold. For example, the pose assessment unit 244 determines whether a time difference between the first time and the second time is within a threshold time period indicated by the acceptability threshold. To that end, in various implementations, the pose assessment unit 244 includes instructions and/or logic therefor, and heuristics and metadata therefor.

In some implementations, the movement generation unit 246 generates a sequence of movements for the SR representation 126 in response to the transition between body poses satisfying the acceptability threshold. In some implementations, the movement generation unit 246 selects a template body movement for the SR representation 126. In some implementations, the movement generation unit 246 selects the template body movement from a set of template body movements that are stored in the memory 220. In some implementations, the movement generation unit 246 selects the template body movement based on the first body pose and the second body pose of the user 108. In such implementations, the movement generation unit 246 selects different template body movements for different start and end body poses of the user 108. To that end, in various implementations, the movement generation unit 246 includes instructions and/or logic therefor, and heuristics and metadata therefor.

In some implementations, the data transmitting unit 248 is configured to transmit data (e.g., presentation data, location data, etc.) to the HMD 120. In some implementations, the data transmitting unit 248 transmits the sequence of movements for the SR representation 126 to the HMD 120. To that end, in various implementations, the data transmitting unit 248 includes instructions and/or logic therefor, and heuristics and metadata therefor.

In some implementations, the pose assessment unit 244 determines the acceptability threshold. In some implementations, the pose assessment unit 244 receives a user input (e.g., from the user 108 and/or a system administrator) indicating the acceptability threshold. In some implementations, the pose assessment unit 244 adjusts the acceptability threshold based on past performance of the user 108. For example, the pose assessment unit 244 widens (e.g., loosens or relaxes) the acceptability threshold if the user 108 is having trouble satisfying the acceptability threshold (e.g., if a number of previous transitions breached the acceptability threshold). In some implementations, the pose assessment unit 244 narrows (e.g., tightens or restricts) the acceptability threshold if the user 108 is satisfying the acceptability threshold too easily (e.g., if a number of previous transitions satisfied the acceptability threshold).

Although the data obtaining unit 242, the pose assessment unit 244, the movement generation unit 246, and the data transmitting unit 248 are shown as residing on a single device (e.g., the controller 110), it should be understood that in other implementations, any combination of the data obtaining unit 242, the pose assessment unit 244, the movement generation unit 246, and the data transmitting unit 248 may be located in separate computing devices.

Moreover, FIG. 2 is intended more as functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
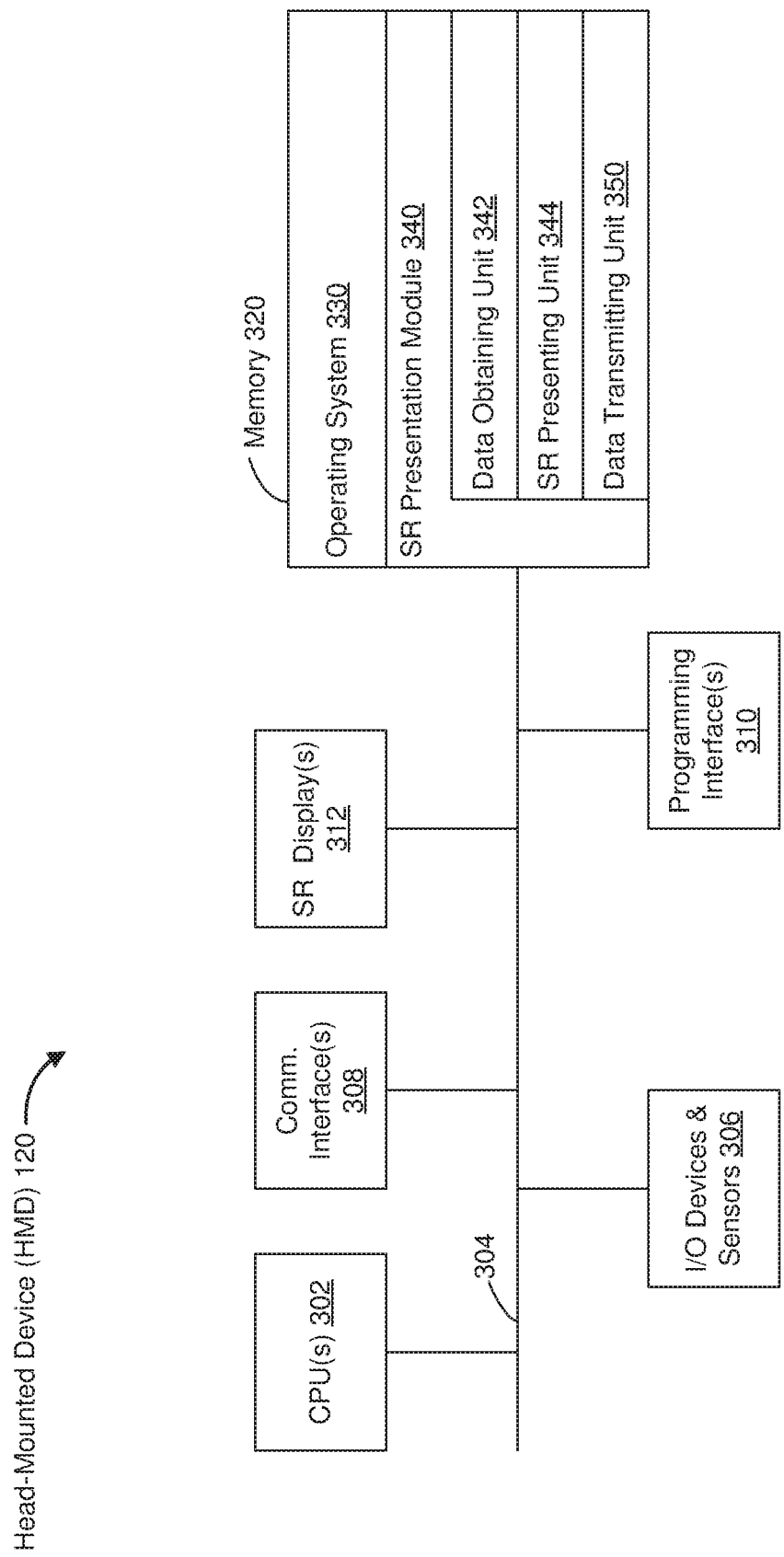
FIG. 3 is a block diagram of an example head-mounted device (HMD) in accordance with some implementations.

FIG. 3 is a block diagram of the HMD 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more SR displays 312, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, and/or the like. In some implementations, the one or more I/O devices and sensors 306 include one or more movement sensors (e.g., the movement sensors 130A-B shown in FIG. 1).

In some implementations, the one or more SR displays 312 are configured to present the SR content 124 to the user 108. In some implementations, the one or more SR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more SR displays 312 correspond to diffractive, reflective, polarized, holographic, etc. waveguide displays. For example, the HMD 120 may include a single SR display. In another example, the HMD 120 may include an SR display for each eye of the user 108. In some implementations, the one or more SR displays 312 are capable of presenting AR and VR content.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an SR experience module 340.

The operating system 330 includes procedures for handling various basic system services and for performing hardware dependent tasks. In some implementations, the SR experience module 340 is configured to present SR content to the user via the one or more SR displays 312. To that end, in various implementations, the SR experience module 340 includes a data obtaining unit 342, an SR presenting unit 344, and a data transmitting unit 350.

In some implementations, the data obtaining unit 342 is configured to obtain data (e.g., presentation data, interaction data, sensor data, location data, etc.) from the controller 110, the movement sensors 130A-B and/or a hand-held device. In some implementations, the data obtaining unit 342 obtains (e.g., receives) data corresponding to the SR content 124 from the controller 110. In some implementations, the data obtaining unit 342 obtains (e.g., receives) the movement information 132 from the movement sensors 130A-B. In some implementations, the data obtaining unit 342 includes movement information (e.g., the movement information 132 shown in FIG. 1) from the one or more I/O devices and sensors 306. To that end, in various implementations, the data obtaining unit 342 includes instructions and/or logic therefor, and heuristics and metadata therefor.

In some implementations, the SR presenting unit 344 is configured to present SR content via the one or more SR displays 312. In some implementations, the SR presenting unit 344 obtains data corresponding to the SR content 124 from the controller 110. Alternatively, in some implementations, the SR presenting unit 344 utilizes the movement information 132 to synthesize the SR content 124. In various implementations, the SR presenting unit 344 presents the SR content 124 to the user 108. To that end, in various implementations, the SR presenting unit 344 includes instructions and/or logic therefor, and heuristics and metadata therefor.

In some implementations, the data transmitting unit 350 is configured to transmit data (e.g., presentation data, location data, etc.) to at least one of the controller 110 and the movement sensors 130A-B. For example, in some implementations, the data obtaining unit 342 receives the movement information 132 from the movement sensors 130A-B, and the data transmitting unit 350 transmits the movement information 132 to the controller 110. To that end, in various implementations, the data transmitting unit 350 includes instructions and/or logic therefor, and heuristics and metadata therefor.

Although the data obtaining unit 342, the SR presenting unit 344, and the data transmitting unit 350 are shown as residing on a single device (e.g., the HMD 120), it should be understood that in other implementations, any combination of the data obtaining unit 342, the SR presenting unit 344, and the data transmitting unit 350 may be located in separate computing devices.

Moreover, FIG. 3 is intended more as functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
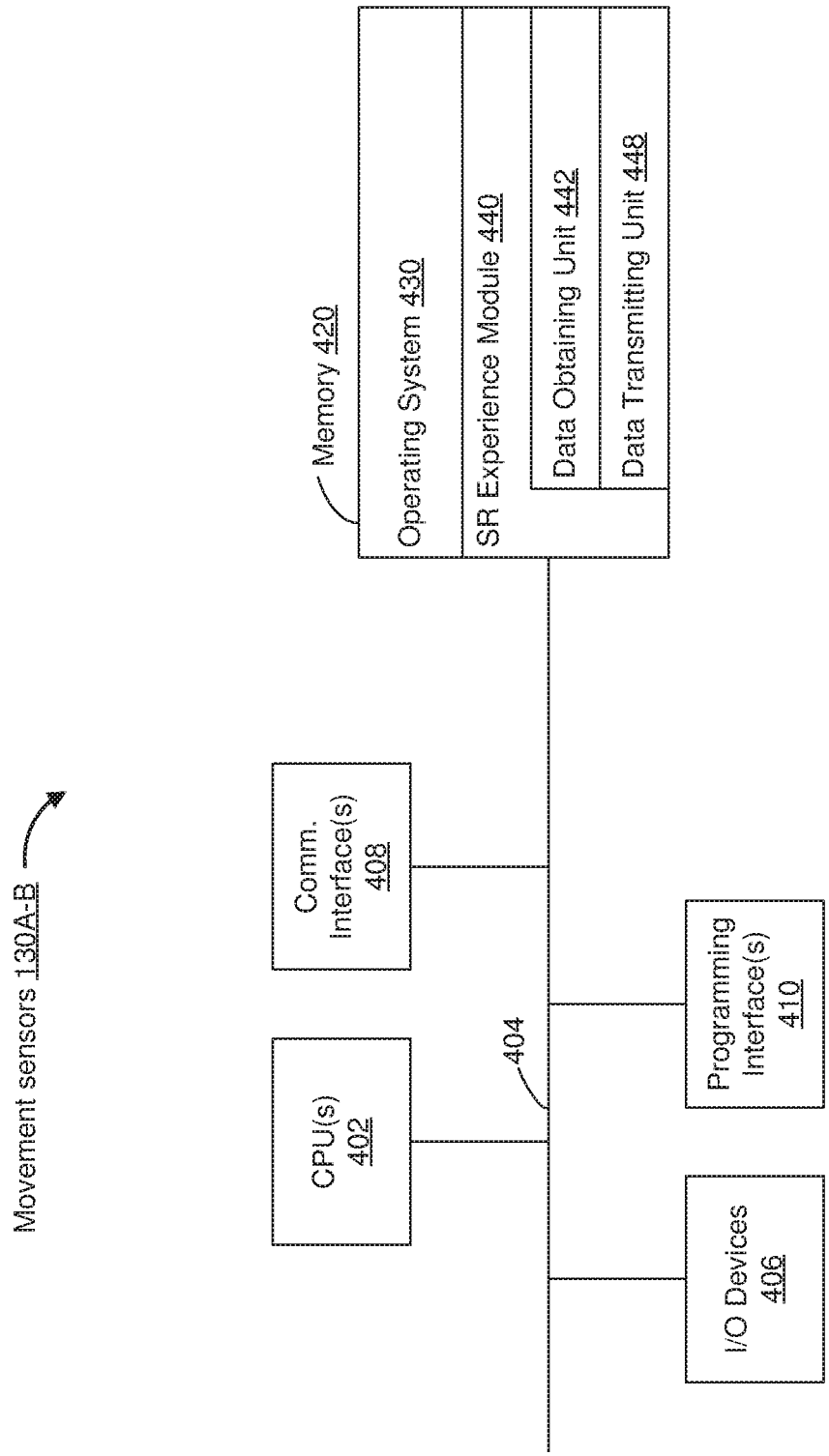
FIG. 4 is a block diagram of an example movement sensor in accordance with some implementations.

FIG. 4 is a block diagram of the movement sensors 130A-B in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the movement sensor 130A-B includes one or more processing units 402 (e.g., microprocessors, ASICs, FPGAs, GPUs, CPUs, processing cores, and/or the like), one or more input/output (I/O) devices and sensors 406, one or more communication interfaces 408 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 410, a memory 420, and one or more communication buses 404 for interconnecting these and various other components.

In some implementations, the one or more communication buses 404 include circuitry that interconnects and controls communications between system components. In some implementations, the one or more I/O devices and sensors 406 include at least one of one or more IMUs, an accelerometer, a gyroscope, a thermometer, one or more physiological sensors (e.g., blood pressure monitor, heart rate monitor, blood oxygen sensor, blood glucose sensor, etc.), a keyboard, a mouse, a touchpad, a joystick, one or more microphones, one or more speakers, one or more image sensors, one or more displays, and/or the like. In some implementations, the movement sensors 130A-B include image sensors (e.g., cameras).

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium. In some implementations, the memory 420 or the non-transitory computer readable storage medium of the memory 420 stores the following programs, modules and data structures, or a subset thereof including an optional operating system 430 and an SR experience module 440.

The operating system 430 includes procedures for handling various basic system services and for performing hardware dependent tasks. In some implementations, the SR experience module 440 is configured to obtain (e.g., capture, sense and/or detect) data that enables synthesis and/or presentation of SR content. For example, the SR experience module 440 captures the movement information 132. To that end, in various implementations, the SR experience module 440 includes a data obtaining unit 442 and a data transmitting unit 448.

In some implementations, the data obtaining unit 442 is configured to obtain (e.g., capture, sense and/or detect) data (e.g., presentation data, interaction data, sensor data, location data, etc.) for at least one of the controller 110 and the HMD 120. In some implementations, the data obtaining unit 442 captures the movement information 132. In some implementations, the data obtaining unit 442 processes data captured by the I/O devices 406 to generate the movement information 132. For example, in some implementations, the data obtaining unit 442 performs scene understanding to identify the user 108 and a body pose of the user 108 (e.g., joint positions of the user 108 and/or joint orientations of the user 108). To that end, in various implementations, the data obtaining unit 442 includes instructions and/or logic therefor, and heuristics and metadata therefor.

In some implementations, the data transmitting unit 448 is configured to transmit data (e.g., presentation data, location data, etc.) to at least one of the controller 110 and the HMD 120. For example, in some implementations, the data transmitting unit 448 transmits the movement information 132 to the controller 110 and/or the HMD 120. To that end, in various implementations, the data transmitting unit 448 includes instructions and/or logic therefor, and heuristics and metadata therefor.

Although the data obtaining unit 442 and the data transmitting unit 448 are shown as residing on a single device (e.g., the movement sensor 130A-B), it should be understood that in other implementations, any combination of the data obtaining unit 442 and the data transmitting unit 448 may be located in separate computing devices.

Moreover, FIG. 4 is intended more as functional description of the various features which be present in a particular implementation as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 5A:
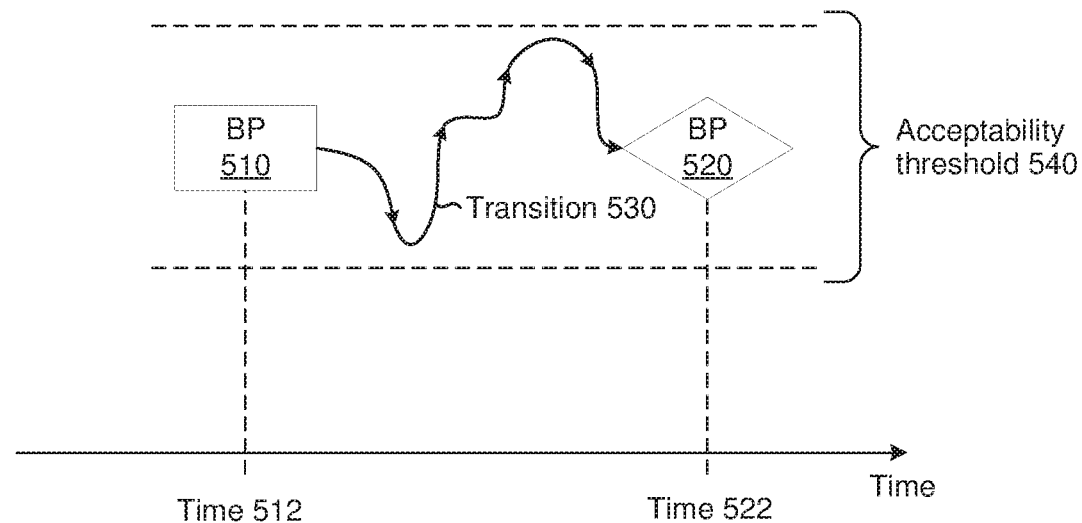
FIGS. 5A-5B illustrate example movement information and acceptability thresholds in accordance with some implementations.
Figure 5B:
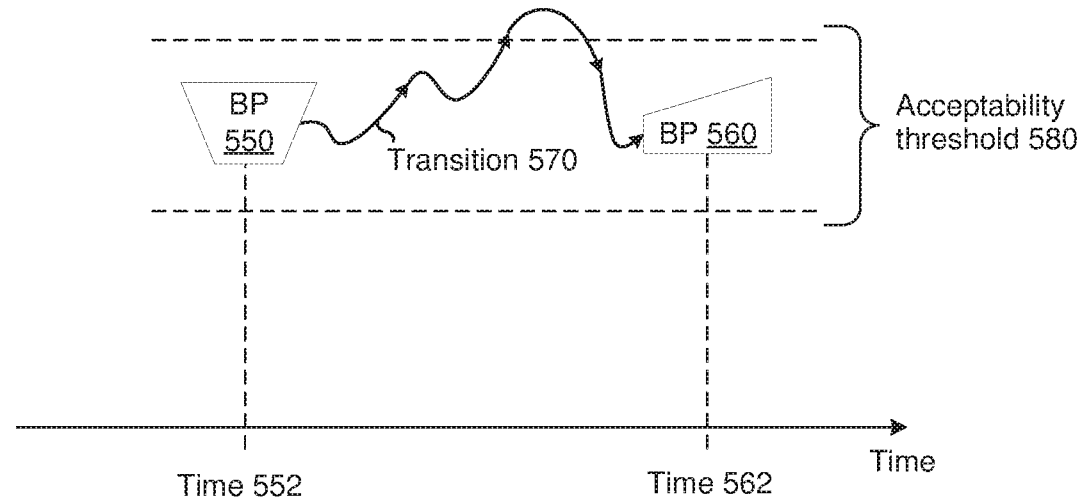

FIGS. 5A-5B illustrate example movement information 500/500A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

FIG. 5A illustrates example movement information 500. The movement information 500 characterizes a first body pose 510 of a user (e.g., the user 108 shown in FIG. 1) at a first time 512 and a second body pose 520 of the user at a second time 522. FIG. 5A also illustrates a transition 530 from the first body pose 510 to the second body pose 520. In the example of FIG. 5A, the transition 530 satisfies an acceptability threshold 540. In some implementations, the transition 530 satisfies the acceptability threshold 540 because the transition 530 includes a movement that matches a template body movement. For example, the transition 530 includes intermediate body poses that match corresponding template body poses. Since the transition 530 satisfies the acceptability threshold 540, the controller 110 and/or the HMD 120 generate a sequence of movements for the SR representation 126 of the user 108. As such, the movement information 500 results in a movement of the SR representation 126 of the user 108.

FIG. 5B illustrates example movement information 500A. The movement information 500A characterizes a third body pose 550 of the user at a third time 552 and a fourth body pose 560 of the user at a fourth time 562. FIG. 5B also illustrates a transition 570 from the third body pose 550 to the fourth body pose 560. In the example of FIG. 5B, the transition 570 breaches (e.g., does not satisfy) an acceptability threshold 580. In some implementations, the transition 570 breaches the acceptability threshold 580 because the transition 570 includes a movement that does not match a template body movement. For example, the transition 570 includes intermediate body poses that do not match corresponding template body poses. Since the transition 570 does not satisfy the acceptability threshold 580, the controller 110 and/or the HMD 120 do not generate a sequence of movements for the SR representation 126 of the user 108. As such, the movement information 500A does not result in a movement of the SR representation 126 of the user 108.

In some implementations, the acceptability threshold changes based on previous transitions satisfying the acceptability threshold. For example, if a threshold number of previous transitions satisfy the acceptability threshold 540 of FIG. 5A, the controller 110 and/or the HMD 120 narrow (e.g., tighten or constrict) the acceptability threshold 540 to the acceptability threshold 580 shown in FIG. 5B. If a threshold number of previous transitions breach the acceptability threshold 580 of FIG. 5B, the controller 110 and/or the HMD 120 widen (e.g., loosen or relax) the acceptability threshold 580 to the acceptability threshold 540 shown in FIG. 5A.

In some implementations, a degree of change in the acceptability threshold is a function of a level of breach by a previous transition. For example, if previous transitions breached the acceptability threshold by 5-10%, then the controller 110 and/or the HMD 120 widen the acceptability threshold by 12%. However, if previous transitions breached the acceptability threshold by 20-30%, then the controller 110 and/or the HMD 120 widen the acceptability threshold by 35%.

In some implementations, changing the acceptability threshold based on previous transitions enhances user experience. Changing the acceptability threshold based on previous transitions accounts for users with different skill levels. Narrowing the acceptability threshold encourages the user to improve his/her transitions between body poses. Widening the acceptability threshold allows the user to satisfy the acceptability threshold even if the user's transitions between body poses are not a close match to template body poses.

Figure 6:
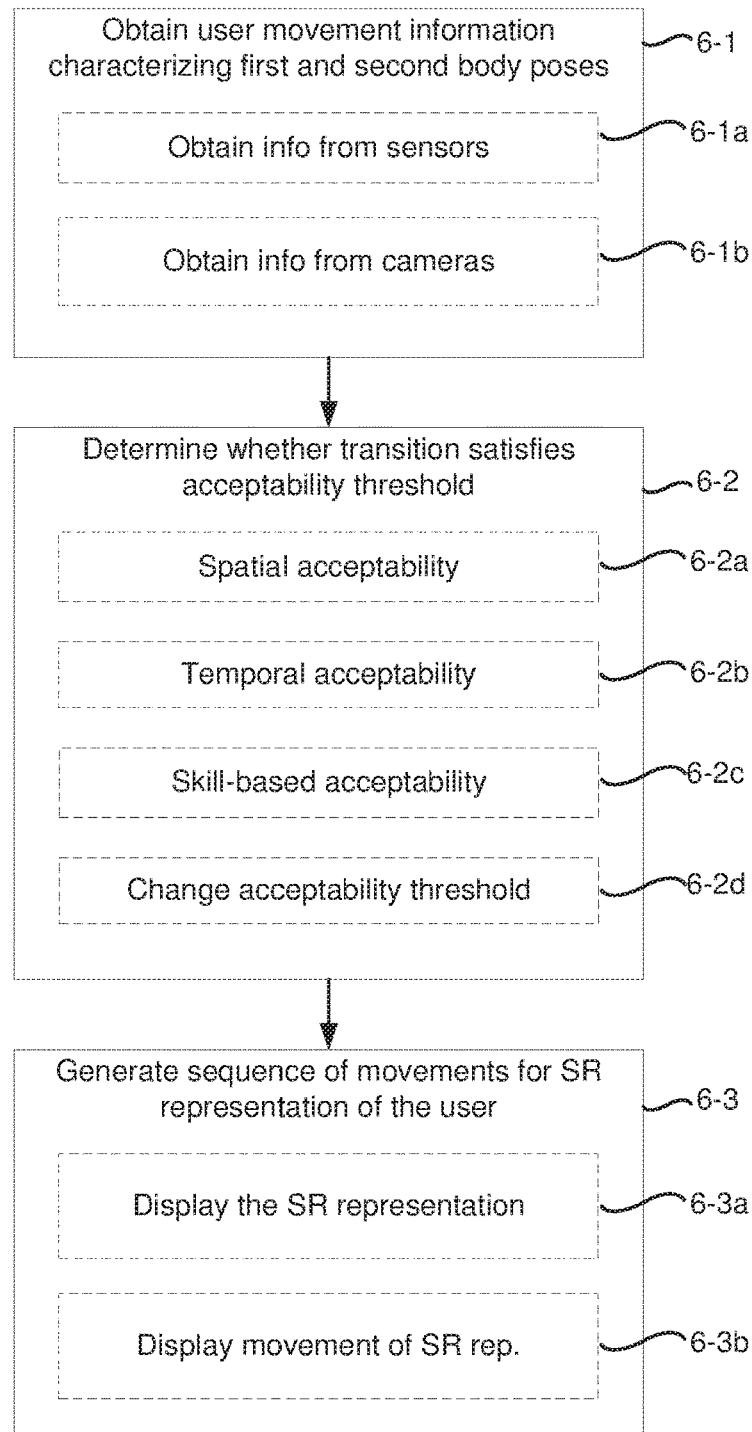
FIG. 6 is a flowchart representation of a method of moving an SR representation based on real-world data in accordance with some implementations.

FIG. 6 is a flowchart representation of a method 600 of moving an SR representation based on real-world data. In various implementations, the method 600 is performed by a device (e.g., the controller 110 of FIGS. 1 and 2, and/or the HMD 120 of FIGS. 1 and 3). In some implementations, the device is configured to translate user movement information (e.g., real-world movement information, for example, the movement information 132 shown in FIG. 1) into a movement of an SR representation of the user. In some implementations, the method 600 is performed by processing logic, including hardware, firmware, software, or a combination thereof. In some implementations, the method 600 is performed by a processor executing code stored in a non-transitory computer-readable medium (e.g., a memory).

As represented by block 6-1, in some implementations, the method 600 includes obtaining user movement information (e.g., the movement information 132 shown in FIG. 1). In some implementations, the movement information characterizes a first body pose of the user at a first time and a second body pose of the user at a second time (e.g., the first body pose 510 at the first time 512 and the second body pose 520 at the second time 522 shown in FIG. 5A).

As represented by block 6-1a, in some implementations, the method 600 includes obtaining the user movement information from one or more sensors (e.g., the movement sensors 130A-B shown in FIGS. 1 and 4). In some implementations, the method 600 includes obtaining the user movement information from sensors that are worn by the user.

As represented by block 6-1b, in some implementations, the method 600 includes capturing one or more images of the user via one or more cameras coupled with the device. In such implementations, the method 600 includes performing instant segmentation and feature extraction on the one or more images to obtain the first body pose and the second body pose of the user. In some implementations, the method 600 includes performing scene understanding the identify the user, joint positions of the user and joint orientations of the user.

As represented by block 6-2, in some implementations, the method 600 includes determining whether a transition from the first body pose to the second body pose satisfies an acceptability threshold (e.g., determining whether the transition 530 from the first body pose 510 to the second body pose 520 satisfies the acceptability threshold 540 shown in FIG. 5A).

As represented by block 6-2a, in some implementations, the method 600 includes determining whether the transition satisfies spatial acceptability. In some implementations, the method 600 includes determining whether the transition from the first body pose to the second body pose includes a first movement that is within the acceptability threshold of a second movement defined by a template body movement. In some implementations, the first movement is characterized by a first set of joint positions and the second movement is characterized by a second set of joint positions. In such implementations, the method 600 includes determining whether the first set of joint positions are within the acceptability threshold of the second set of joint positions. In some implementations, the first movement is characterized by a first set of joint orientations and the second movement is characterized by a second set of joint orientations. In such implementations, the method 600 includes determining whether the first set of joint orientations are within the acceptability threshold of the second set of joint orientations.

As represented by block 6-2b, in some implementations, the method 600 includes determining whether the transition satisfies temporal acceptability. In some implementations, the method 600 includes determining whether a time difference between the first time and the second time is within the acceptability threshold of an amount of time associated with a template body movement.

As represented by block 6-2c, in some implementations, the method 600 includes obtaining a value indicating a skill level of the user (e.g., '1' for beginner, '5' for intermediate, and '10' for expert). In some implementations, the user indicates their skill level by providing the value. In some implementations, the controller 110 and/or the HMD 120 determine the skill level of the user based on the user's past performance (e.g., if less than 20% of previous transitions satisfy the acceptability threshold, then the controller 110 and/or the HMD 120 determines that the user is a beginner). In such implementations, the method 600 includes selecting the acceptability threshold based on the skill level of the user. For example, the acceptability threshold is wide for beginners and narrow for experts.

As represented by block 6-2d, in some implementations, the method 600 includes changing the acceptability threshold based on previous transitions. In some implementations, the method 600 includes narrowing the acceptability threshold in response to a number of previous transitions satisfying the acceptability threshold (e g, making it more difficult to satisfy the acceptability threshold). In some implementations, the method 600 includes widening the acceptability threshold in response to a number of previous transitions breaching the acceptability threshold (e g, making it easier to satisfy the acceptability threshold).

As represented by block 6-3, in some implementations, the method 600 includes in response to determining that the transition from the first body pose to the second body pose satisfies the acceptability threshold, generating a sequence of movements for an SR representation of the user (e.g., generating the sequence of movements for the SR representation 126 shown in FIG. 1).

As represented by block 6-3a, in some implementations, the method 600 includes displaying the SR representation of the user (e.g., displaying the SR representation 126 as part of the SR content 124 shown in FIG. 1). In some implementations, the method 600 includes displaying an avatar of the user in the SR environment.

As represented by block 6-3b, in some implementations, the method 600 includes displaying movement of the SR representation in accordance with the sequence of movements. In some implementations, the SR representation performs the sequence of movements that were generated for the SR representation.

In some implementations, the method 600 includes in response to determining that the transition from the first body pose to the second body breaches the acceptability threshold (e.g., as shown in FIG. 5B), displaying a template body movement that shows another transition from the first body pose to the second body pose. The other transition satisfies the acceptability threshold. Displaying the template body movement allows the user to correct his/her transition so that the transition is acceptable.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:
1. A method comprising:
at a device including a non-transitory memory and one or more processors coupled with the non-transitory memory:
obtaining movement information, wherein the movement information characterizes a first body pose of a user at a first time and a second body pose of the user at a second time;
determining an acceptability threshold based on a skill level of the user;
determining whether a transition from the first body pose to the second body pose satisfies the acceptability threshold;
in response to determining that the transition from the first body pose to the second body pose breaches the acceptability threshold, displaying a template body movement that shows another transition from the first body pose to the second body pose, wherein the other transition satisfies the acceptability threshold; and
in response to determining that the transition from the first body pose to the second body pose satisfies the acceptability threshold, generating a sequence of movements for a representation of the user.

2. The method of claim 1, wherein determining whether the transition from the first body pose to the second body pose satisfies the acceptability threshold comprises:
determining whether the transition from the first body pose to the second body pose includes a first movement that is within the acceptability threshold of a second movement defined by a template body movement.

3. The method of claim 2, wherein the first movement is characterized by a first set of joint positions and the second movement is characterized by a second set of joint positions; and wherein determining whether the first movement is within the acceptability threshold of the second movement comprises determining whether the first set of joint positions are within the acceptability threshold of the second set of joint positions.

4. The method of claim 2, wherein the first movement is characterized by a first set of joint orientations and the second movement is characterized by a second set of joint orientations; and
wherein determining whether the first movement is within the acceptability threshold of the second movement comprises determining whether the first set of joint orientations are within the acceptability threshold of the second set of joint orientations.

5. The method of claim 1, wherein determining whether the transition from the first body pose to the second body pose satisfies the acceptability threshold comprises:
determining whether a time difference between the first time and the second time is within the acceptability threshold of an amount of time associated with a template body movement.

6. The method of claim 1, further comprising:
narrowing the acceptability threshold in response to a number of previous transitions satisfying the acceptability threshold.

7. The method of claim 1, further comprising:
widening the acceptability threshold in response to a number of previous transitions breaching the acceptability threshold.

8. The method of claim 1, further comprising:
displaying the representation of the user in a computer-created setting.

9. The method of claim 1, further comprising:
in response to determining that the transition from the first body pose to the second body pose satisfies the acceptability threshold, displaying movement of the representation of the user in accordance with the sequence of movements.

10. The method of claim 1, wherein obtaining the movement information comprises obtaining the movement information from external sensors.

11. The method of claim 1, wherein obtaining the movement information comprises:
capturing one or more images via one or more cameras coupled with the device; and
performing instant segmentation and feature extraction on the one or more images to obtain the first body pose and the second body pose.

12. A device comprising:
a non-transitory memory; and
one or more processors to:
obtain movement information, wherein the movement information characterizes a first body pose of a user at a first time and a second body pose of the user at a second time;
determine an acceptability threshold based on a skill level of the user;
determine whether a transition from the first body pose to the second body pose satisfies the acceptability threshold;
in response to determining that the transition from the first body pose to the second body pose breaches the acceptability threshold, display a template body movement that shows another transition from the first body pose to the second body pose, wherein the other transition satisfies the acceptability threshold; and
in response to determining that the transition from the first body pose to the second body pose satisfies the acceptability threshold, generate a sequence of movements for a representation of the user.

13. The device of claim 12, wherein the one or more processors are to determine whether the transition from the first body pose to the second body pose satisfies the acceptability threshold by determining whether the transition from the first body pose to the second body pose includes a first movement that is within the acceptability threshold of a second movement defined by a template body movement.

14. The device of claim 12, wherein the one or more processors are to determine whether the transition from the first body pose to the second body pose satisfies the acceptability threshold by determining whether a time difference between the first time and the second time is within the acceptability threshold of an amount of time associated with a template body movement.

15. The device of claim 12, wherein the one or more processors are further to narrow the acceptability threshold in response to a number of previous transitions satisfying the acceptability threshold.

16. The device of claim 12, wherein the one or more processors are further to widen the acceptability threshold in response to a number of previous transitions breaching the acceptability threshold.

17. The device of claim 12, wherein the one or more processors are further to, in response to determining that the transition from the first body pose to the second body pose satisfies the acceptability threshold, display movement of the representation of the user in accordance with the sequence of movements.

18. A non-transitory memory having instructions encoded thereon which, when executed by one or more processors of a device, cause the device to:
obtain movement information, wherein the movement information characterizes a first body pose of a user at a first time and a second body pose of the user at a second time;
determine an acceptability threshold based on a skill level of the user;
determine whether a transition from the first body pose to the second body pose satisfies the acceptability threshold;
in response to determining that the transition from the first body pose to the second body pose breaches the acceptability threshold, display a template body movement that shows another transition from the first body pose to the second body pose, wherein the other transition satisfies the acceptability threshold; and
in response to determining that the transition from the first body pose to the second body pose satisfies the acceptability threshold, generate a sequence of movements for a representation of the user.

* * * * *